United States Patent Office 3,467,845
Patented Sept. 16, 1969

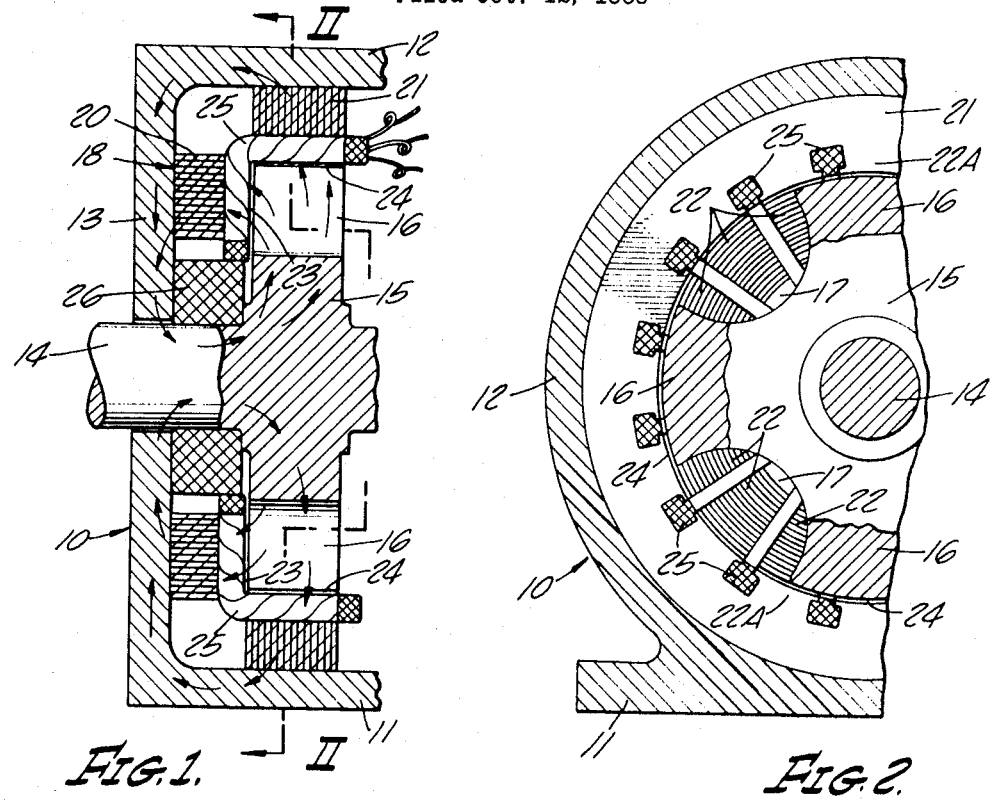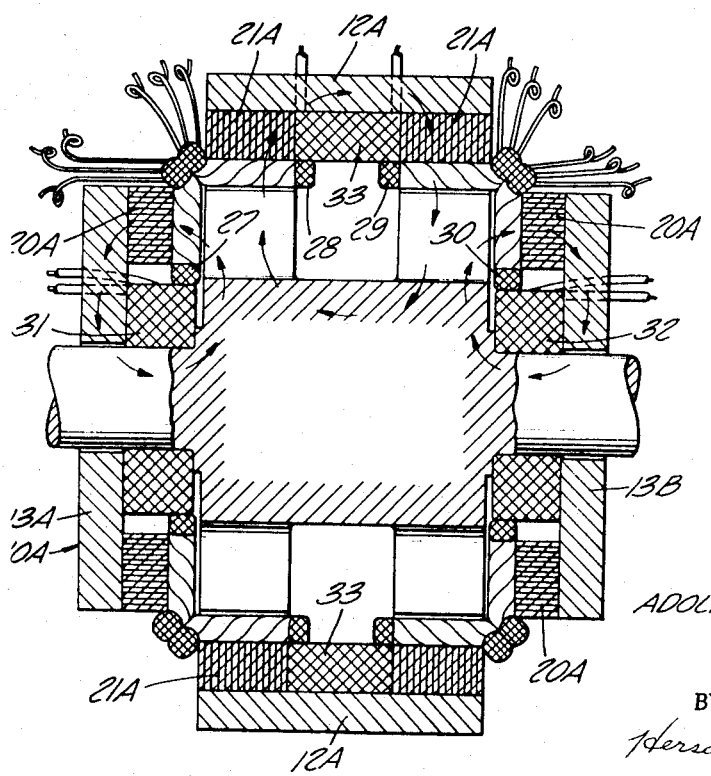

3,467,845
ALTERNATING CURRENT GENERATOR
Adolph J. Wesolowski, Phoenix, Ariz., assignor to The Garrett Corporation, Los Angeles, Calif., a corporation of California
Filed Oct. 12, 1966, Ser. No. 586,300
Int. Cl. H02k 17/42, 19/20
U.S. Cl. 310—168     13 Claims

ABSTRACT OF THE DISCLOSURE

This alternating current generator has a magnetic casing with peripheral and end walls. One armature core is mounted on an end wall, another is mounted on the peripheral wall, and both have slots to provide stator teeth. A rotor is supported for rotation in the casing with circumferentially spaced poles disposed in closely spaced relation to the ends of the cores, thus providing axial and radial air gaps. A continuous armature coil is wound through the slots and around the teeth, part of the coil being parallel to the side of the rotor and part substantially parallel to the peripheral ends of the rotor poles. A field coil mounted on the end wall within the core encircles the rotor shaft and when energized causes a flux to flow through the rotor, across both air gaps, through the armature cores, and returns through the casing walls. The aramture coil is cut by the flux flowing across both air gaps. The efficiency of the generator is greatly increased.

A second form is illustrated in which the rotor has two sets of radiating poles and an armature core is mounted at each end of the casing. An armature core is also arranged in the casing in radial alignment with each set of radiating poles. An armature coil is wound through the teeth-forming slots and around the teeth on each armature core. Field excitation coils are disposed adjacent each armature core. Both forms of the invention illustrated have a single one-piece rotor, an armature core, a field coil, and an amature coil at the side and at the periphery of the rotor poles. The lines of flux crossing the axial gap at the sides of the poles cuts an armature coil the same as those crossing the radial gap.

---

This invention relates generally to electrical apparatus and is more particularly directed to machines for generating alternating current. Still more particularly, the invention is aimed toward lightweight devices which operate at ultra-high, generally variable speeds to generate alternating current used in aircraft or space vehicles.

An object of this invention is to modify axial air-gap-type inductor alternators, such as are shown in my Patent 3,243,621 and application Ser. 499,436, filed Oct. 21, 1965, to increase the output thereof or to cause such alternators to produce a multiplicity of independent outputs.

Another object of the invention is to provide an alternating current generator having an integral rotor with spaced radiating poles and stator structue cooperating with the poles to provide both axial and radial air gaps whereby the tips of the radiating poles, as well as the faces thereof, will be utilized in the production of current.

Still another object of the invention is to provide an alternating current generator having a rotor with spaced radiating poles and stator means with one armature core at one side face of the poles and a second core at the periphery of the rotor poles, a continuous armature coil being associated with both cores, part of the coil being in parallel relation to the side face of the poles and another part substantially parallel with the outer ends of the radiating poles, and a stator return iron cooperating with both armature cores to complete the flux path.

A further object is to provide an alternating current generator of the general type mentioned in the preceding paragraphs in which the armature cores at the sides and ends of the rotor poles are provided with separate or independent armature coils whereby a plurality of outputs may be produced with a single rotor.

A still further object is to provide an alternating current generator in which the rotor is formed with two sets of radiating poles, each of which cooperates with a plurality of different armature cores to produce an axial and a radial air gap, an armature coil being employed for each armature core, and means being provided to produce magnetic flux fields whereby the effect of a plurality of generators will be secured.

Other objects and advantages of the invention will be made apparent by the following description of two forms of the invention selected for illustration in the accompanying drawing.

In the drawing:
FIG. 1 is an axial schematic sectional view of an alternating current generator embodying the present invention;
FIG. 2 is a vertical transverse sectional view taken through the generator on the plane indicated by the line II—II of FIG. 1; and
FIG. 3 is an axial sectional view through a modified form of generator embodying the present invention.

Referring particularly to FIGS. 1 and 2, the generator shown therein includes a frame 10, which will be formed of soft iron or other suitable magnetic material. In the form of the invention illustrated, this frame has a base portion 11 and a cylindrical outer wall 12 with one or more end walls 13. In this form of the invention the base, outer wall, and end walls are in magnetic flux-conducting contact or other relation. The frame is provided with suitable bearings (not shown) for the rotatable support of a shaft 14, this shaft being provided with the hub 15 of the generator rotor. In the form of the invention shown, the hub is integrally formed with the shaft and is provided with a plurality of poles 16 radiating therefrom, air spaces 17 being formed between the radiating poles.

Frame 10 supports a stator means 18 which in the first form of the invention includes a section 20 carried by the end wall 13 and a second section 21 carried by the cylindrical outer wall portion 12 of the frame. These sections are composed of laminated iron plates or strips wound or stacked in the usual manner. Each stator section is provided with slots circumferentially spaced about the axis of the shaft 14, the slotting of the stator sections providing stator teeth 22 and 22A. The teeth 22 are formed on the stator section 20 and are spaced a limited distance from from one side wall of the rotor poles 16, thus cooperating therewith to provide an axial air gap 23. The teeth 22A are formed on the stator section 21 which surrounds the periphery of the rotor, the inner surfaces of the teeth 22A also being slightly spaced from the peripheral ends of the poles 16 and cooperating therewith to form a radial air gap 24.

The sets of stator teeth 22 and 22A support the turns of an armature coil 25, the turns passing through the spaces between the teeth and around one tooth or groups of teeth. It will be noted from FIG. 1 that part of the armature coil is disposed in planes parallel to that in which the rotor poles revolve, while another part is disposed substantially parallel to the end surfaces of the poles. A single armature coil is provided in the first form of the invention.

The generator is also provided with a field coil 26, this coil being disposed around the shaft within the armature section 20. Coil 26 is stationary and is supplied with current to secure the required magnetic flux. This flux flows, as indicated by arrows on FIG. 1, outwardly in the rotor, across the axial and radial air gaps into the stator teeth, and into the frame 10 which constitutes a return path for the flux. The flux passes from the return iron formed by the outer and end walls of the frame into the shaft and along the shaft to the rotor hub. The magnetic field induces a current in the armature coil which rises and falls as the rotor poles pass from one group of stator teeth to another in the usual manner.

Since the area of the air gaps is increased by that formed between the ends of the poles and the circular ring of stator teeth adjacent the ends of the poles, the power output of the generator will also be increased. This increase will be secured even though a single rotor is employed. It will be readily apparent from FIG. 1 that the outer ends of the rotor poles will serve a useful purpose which would not be utilized in the event an armature core were provided only on the end wall. The output of the generator is thus increased with the addition of a minimum amount of material.

In the form of the invention shown in FIG. 3, the generator is provided with a rotor having two sets of poles spaced axially of the shaft. These poles are also circularly spaced around the axis of rotation, as are the poles in the first form of the invention. In the modified form, the frame 10A has a cylindrical outer wall 12A and two end walls 13A and 13B, each end wall supporting armature core sections 20A. The outer and end walls, in this form of the invention, are electrically spaced from one another. The core sections 20A are similar to section 20 in the first form of the invention, being composed of wound strips of iron and provided with slots to form stator teeth. The ends of these teeth are slightly spaced from the adjacent end surfaces of the rotor poles and cooperate therewith to provide a pair of axial air gaps. The cylindrical outer wall portion 12A of the frame 10A supports an armature core having a pair of sections 21A, each being disposed in radial registration with a set of rotor poles. The sections 21A are similar to the armature core section 21 of the first form of the invention, being composed of stacked plates of iron and slotted at the inner side to provide stator teeth. The inner surfaces of these stator teeth are spaced from the peripheral ends of the poles and cooperate therewith to provide a plurality of radial air gaps. In the modified form of the invention, the stator teeth for each air gap, both axial and radial, receive a separate armature coil 27, 28, 29, and 30, coil 27 being at one end of the rotor, coils 28 and 29 being at the peripheries of the poles, and coil 30 being at the other end of the rotor.

The generator of FIG. 3 has also a plurality of field coils 31, 32 and 33, coils 31 and 32 being disposed on the end walls within the confines of the stators, and coil 33 being disposed on the frame section 12A between the stators 21A. When current from a suitable source is supplied to the field coils 31, 32 and 33, magnetic fluxes will be generated, these fluxes flowing as indicated by the arrows in FIG. 3. One flux field will flow through the rotor at the left end of FIG. 3, another at the right end, and the third at the outer portion, the cylindrical portion 12A of the frame constituting the return iron between the stator sections at the ends of the rotor poles. As the rotor is revolved, while the fields coils are energized, three different outputs will be produced, one from each of the armature coils. As in the first form of the invention, the voltage will increase and decrease as the poles move from one group of armature poles to the other in each section of the armature. By providing the additional rotor and stator sections and locating some of the latter at the ends of the rotor poles the output of the generator may be increased substantially. By utilizing separate armature coils and supplying additional field coils, a plurality of separate alternating currents may be produced.

By way of summary, the modified construction shown in FIG. 3 will produce the effect of three independent generators since three separate field coils are used. The flux paths produced by such field coils (assuming that the iron is not saturated) will be independent; hence, each generator will have the following characteristics:

(1) It must generate voltage and current at the same frequency;

(2) It may have a rated output in kva. different from each other generator;

(3) It may have a different load power factor different from each other generator;

(4) It may produce a different voltage from each other generator; and (5) It may produce an output of a different phase than each other generator.

In the radial air gap portion of the modified form of generator, both stator elements can be joined by a single armature winding, if desired, or by two separate windings as shown. When two windings are provided, one could be used by itself, if desired, and the other retained as a spare, a minimum of time being required to effect a changeover.

While the invention has been illustrated and described in two preferred forms, it is obvious that many minor modifications may be made in the construction and relation of parts without departing from the spirit and scope of the invention.

I claim:

1. An alternating current generator comprising:
    (a) a one-piece rotor member supported for rotation and having circularly spaced poles integral therewith radiating therefrom;
    (b) stator means disposed adjacent said rotor member with a set of circularly spaced teeth at one side of said rotor to provide an axial air gap and another set of circularly spaced teeth around the periphery of said rotor to provide a radial air gap;
    (c) armature coil means wound around and between the stator teeth at both axial and radial air gaps;
    (d) stator return iron means adjacent said sets of spaced teeth; and
    (e) field coil means for creating a magnetic flux which flows through said rotor poles, across said air gaps, and through said stator teeth and stator return iron means.

2. An alternating current generator as in claim 1 in which the armature coil means for the stator teeth of the axial and radial air gaps is a continuous coil.

3. An alternating current generator as in claim 1 in which the armature coil means for the stator teeth of the axial air gap is independent of the armature coil means for the stator teeth of the radial air gap.

4. An alternating current generator as in claim 1 in which the stator teeth at the radial air gap are independent of the teeth at the axial air gap and the armature coil means for such sets of teeth are also independent.

5. An alternating current generator as in claim 1 in which the stator teeth at the radial air gap are independent of the teeth at the axial air gap, the armature coil means for such sets of teeth are also independent, and each set of teeth has an independent stator return iron means.

6. An alternating current generator as in claim 1 in which the rotor member has axially spaced sections with circularly spaced poles radiating therefrom, the stator means has sets of teeth disposed relative to and cooperating with the spaced rotor poles to provide dual axial and radial air gaps, and the armature coil means are arranged relative to the sets of teeth to provide a plurality of generators using a single integral rotor.

7. An alternating current generator as in claim 1 in which the means for creating the magnetic flux includes a field coil extending around the axis of rotation of the rotor within said stator means.

8. An alternating current generator as in claim 1 in which the armature coil means around said sets of teeth extend substantially parallel to the faces of the rotor poles cooperating therewith to form the respective air gaps.

9. An alternating current generator as in claim 1 in which the rotor member has axially spaced sets of circularly spaced radiating poles, the stator means has a set of cicularly spaced teeth at one side of each set of poles to form a plurality of axial air gaps and a set of circularly spaced teeth around the peripheries of each set of poles to form a plurality of radial air gaps, and the armature coil means includes independent coils around the teeth at each air gap.

10. An alternating current generator as in claim 9 in which the stator return iron means has an independent portion adjacent the teeth at each axial air gap.

11. An alternating current generator as in claim 10 in which the means for creating a magnetic flux includes a field coil adjacent each stator return iron means.

12. An alternating current generator as in claim 1 in which the stator teeth at the periphery of the rotor are equal in number to the stator teeth at the side of the rotor, the spaces between the teeth of said sets being in angular registration around the axis of said rotor member and receiving portions of said armature coil means.

13. An alternating current generator as in claim 1 in which the rotor member has a pair of sets of circularly spaced poles radiating therefrom at longitudinally spaced regions, said stator means has a set of circularly spaced teeth at each end of the rotor member to provide a pair of axial air gaps and a set of circularly spaced teeth around the periphery of each of said set of circularly spaced poles to provide radial air gaps, said armature coil means has a coil for each set of stator teeth, said stator return iron means has a section for each set of teeth at the ends of the rotor member and another for the sets of teeth around the peripheries of rotor poles, and said field coil means has a separate coil for creating a magnetic flux in the stator means at each end of the rotor and that around the periphery of the rotor poles, such fluxes flowing through the adjacent portions of the rotor, across the air gaps, through the stator teeth and back through the return iron means.

References Cited
UNITED STATES PATENTS

| | | | |
|---|---|---|---|
| 2,802,959 | 8/1957 | Powers | 310—263 X |
| 3,243,621 | 3/1966 | Wesolowski | 310—268 X |
| 3,261,998 | 7/1966 | Bosco | 310—168 X |
| 3,319,100 | 5/1967 | Erickson | 310—168 |
| 3,321,652 | 5/1967 | Opel | 310—263 X |

MILTON O. HIRSHFIELD, Primary Examiner

EZRA SUTTON, Assistant Examiner

U.S. Cl. X.R.

310—198, 268